United States Patent [19]
Chavez, Jr.

[11] Patent Number: 6,018,666
[45] Date of Patent: *Jan. 25, 2000

[54] SHARED WIRELESS TENANT SERVICE SYSTEM

[75] Inventor: David L. Chavez, Jr., Thornton, Colo.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,840

[22] Filed: Aug. 30, 1996

[51] Int. Cl.$^7$ ....................................................... H04Q 7/20
[52] U.S. Cl. ............................ 455/465; 455/462; 455/435
[58] Field of Search ...................... 455/403, 422, 455/432, 433, 435, 436, 450, 456, 465, 560, 565, 419, 518, 519, 410, 411, 525, 420, 434, 464; 379/207

[56] References Cited

U.S. PATENT DOCUMENTS

| | | | |
|---|---|---|---|
| 5,159,625 | 10/1992 | Zicker | 455/419 |
| 5,321,743 | 6/1994 | Bogart et al. | 379/207 |
| 5,361,396 | 11/1994 | Onoe et al. | 455/435 |
| 5,365,572 | 11/1994 | Saegusa et al. | 455/463 |
| 5,379,451 | 1/1995 | Nakagoshi et al. | 455/435 |
| 5,396,541 | 3/1995 | Farwell et al. | 379/60 |
| 5,418,838 | 5/1995 | Havermans et al. | 455/465 |
| 5,432,843 | 7/1995 | Bonta | 455/436 |
| 5,438,608 | 8/1995 | Kojima | 455/465 |
| 5,465,397 | 11/1995 | Pickert | 455/465 |
| 5,530,945 | 6/1996 | Chavez, Jr. et al. | 379/62 |
| 5,572,574 | 11/1996 | Barnes et al. | 455/435 |
| 5,642,398 | 6/1997 | Tiedemann, Jr. et al. | 455/440 |
| 5,794,149 | 8/1998 | Hoo | 455/438 |

FOREIGN PATENT DOCUMENTS

| | | | |
|---|---|---|---|
| 0 510 630 | 10/1992 | European Pat. Off. | H04Q 7/04 |
| 0 533 510 | 3/1993 | European Pat. Off. | H04M 1/72 |

Primary Examiner—Dwayne D. Bost
Assistant Examiner—Jean A Gelin
Attorney, Agent, or Firm—John C. Moran

[57] ABSTRACT

Limiting the base stations to which a wireless terminal will attempt to establish communication. In a first and second embodiment this is done by the wireless switching system or another system having the capability of storing within each individual wireless terminal a list of base stations that can be utilized by that wireless terminal. When a wireless terminal first registers on the wireless switching system, the wireless switching system would be responsive to the identification code of the wireless terminal to transmit a list of base stations that can be utilized by the wireless terminal to the wireless terminal. The wireless terminal then stores that list for future use. In a third embodiment, each tenant would be assigned a group number. Each of the base stations would periodically transmit the numbers of the groups that could access the base station. A wireless terminal monitors these group numbers before attempting to register on a base station.

16 Claims, 8 Drawing Sheets

SHARED WIRELESS TENANT SERVICE SYSTEM

TECHNICAL FIELD

This invention relates to cordless, cellular, and PCS telecommunication systems and more particularly, a wireless telecommunications switching system providing shared service for a number of distinct user groups.

BACKGROUND OF THE INVENTION

Within the prior art, a shared tenant service is provided by the Lucent Technologoies Definity Telecommunications System. This service allows the owner of a building or shopping mall to purchase a Definity Telecommunications System and to provide telephone services to the tenants of the building. Each tenant pays for a fixed number of wired telephones and access to a fixed number of central office trunks. From the tenant's point of view, the telecommunications switching system appears to be servicing only that tenant. The advantage is that the tenant gains access to a sophisticated telecommunication system having a wide variety of features. Also, the overall cost of obtaining telecommunication service by each tenant is lower.

It has become common for large companies to install personal communication service (PCS) systems in buildings wholly controlled by the corporation. This allows the employees to be constantly available via their PCS telephones and has come into widespread use. However, in a building occupied by multiple tenants, it is not feasible for each tenant to have their own PCS system simply because of the potential for interference between the systems and the added cost of having individual PCS systems. In addition, various tenants may want their PCS service to be throughout the building rather than just in the area leased by the tenant. An example of such a situation is in an airport where each airline wants their employees to be constantly in touch throughout the airport. Also, one tenant may wish to provide PCS service to the employees of all tenants. An example of such a tenant, would be a restaurant or bank located within the building who wishes to provide PCS access as a customer service. For these reasons, a wireless switching system providing shared tenant service in a multi-tenant building appears to be a desired solution. This method is undesirable since the cost of the base stations and the installation of these base stations represents a large cost factor of a wireless switching system. Further, different tenants could well wish to have different levels of service. For example, one tenant might wish its employees to only have wireless service within the portion of the building leased by the tenant; whereas, another tenant may wish to have its employees have access to a base station throughout the building. Each tenant would be charged for each base station to which they have access. U.S. Pat. No. 5,530,945 discloses a wireless shared tenant service. The solution of U.S. Pat. No. 5,530,945 is to allow a wireless terminal to register on any base station; and then if that base station is not accessible to the wireless terminal, drop the wireless terminal from the base station. The problem with this solution is that a wireless telephone owned by an employee who was only authorized for limited use would constantly be attempting registration on base stations on which it could not register. This generates a large amount of administrative traffic for the wireless switching system and also lower the availability of the base stations to authorize wireless terminals.

SUMMARY OF THE INVENTION

This invention is directed to solving this problem and other disadvantages of the prior art. According to the invention, each wireless terminal is limited to which base stations that it attempts to establish communication. Advantageously, in a first and second embodiment this is done by the wireless switching system or another system having the capability of storing within each individual wireless terminal a list of base stations that can be utilized by that wireless terminal. When a wireless terminal first registers on the wireless switching system, the wireless switching system would be responsive to the identification code of the wireless terminal to transmit a list of base stations that can be utilized by the wireless terminal to the wireless terminal. The wireless terminal then stores that list for future use. In a third embodiment, each tenant would be assigned a group number. Each of the base stations would periodically transmit the numbers of the groups that could access the base station. A wireless terminal monitors these group numbers before attempting to register on a base station.

Other and further aspects of the present invention will become apparent during the course of the following description and by reference to the accompanying drawing.

DETAILED DESCRIPTION

Figure 1:
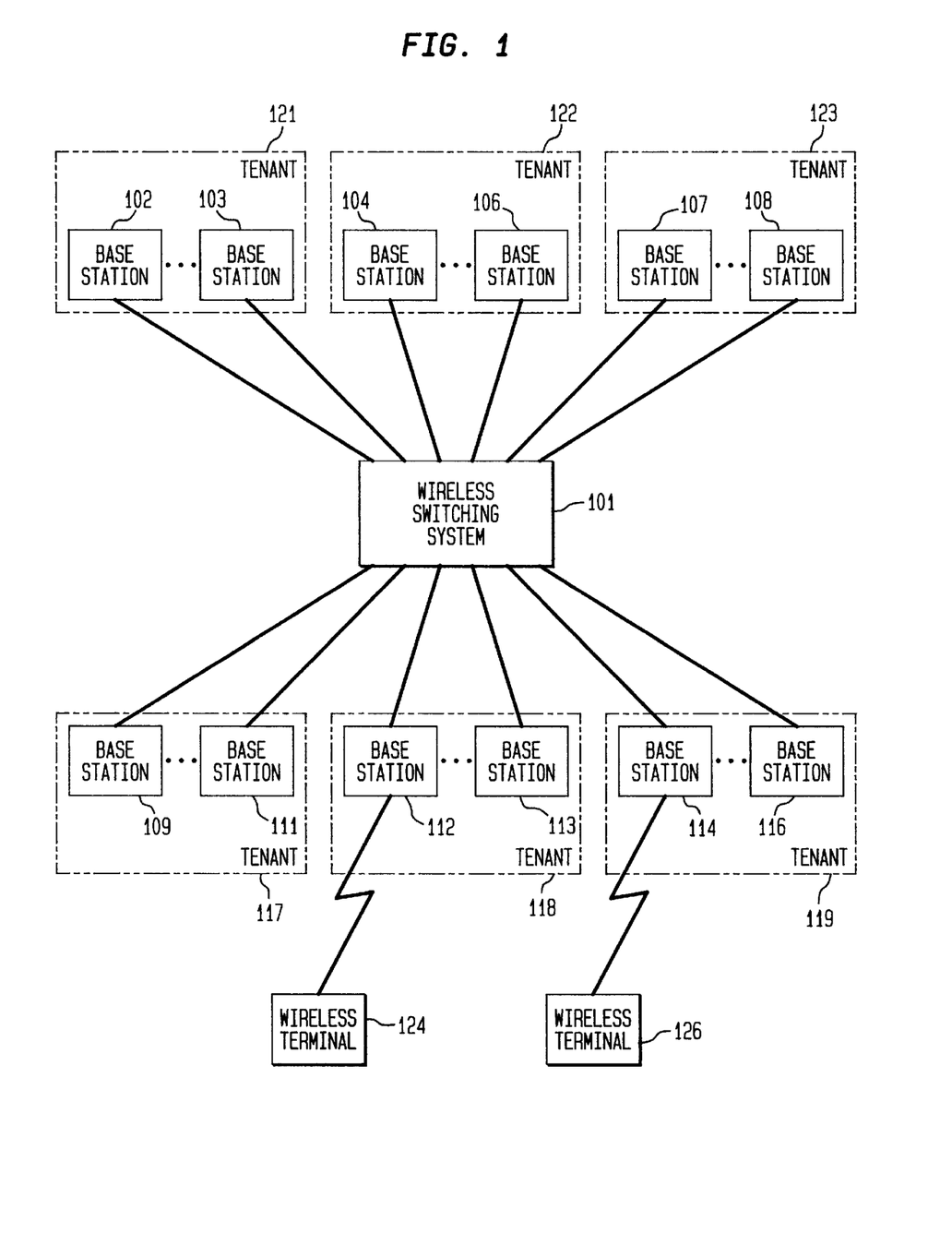
FIG. 1 illustrates, in block diagram form, a wireless switching system for implementing the inventive concept.

FIG. 1 illustrates a wireless switching system having a plurality of base stations 102–116 interconnected to wireless switching system 101. Each of the base stations of tenant group is dedicated to serving wireless terminals as designated by the tenant, such as tenant 118. Tenants 117–123 occupy space within a common building such as an office building, shopping mall, or airport. Whereas, the base stations are dedicated to serving wireless terminals designated by a particular tenant, the base stations may be physically dispersed covering areas outside of the physical space leased by the tenant in the building. Also, to illustrate one aspect of the invention, tenant 121 makes its base stations 102–103 available to all wireless terminals authorized to connect to wireless switching system 101. The result is that wireless terminal 124 can register on base stations 112–113 and base stations 102–103. Similarly, wireless terminal 126 can register on base stations 114–116 and base stations 102–103. One skilled in the art could readily see that there would be a large number of wireless terminals utilizing wireless switching system 101.

Consider the following example of a first and second embodiments. When wireless terminal 124 is searching for a base station on which to register, it consults an internal list of base stations on which it is allowed to register. In the present example, wireless terminal 124 can register on base stations 112–113 and 102–103. Each base station transmits its identification as part of the information that wireless terminal 124 interrogates in searching for a base station on which to register. Wireless terminal 124 ignores all base stations except those included in its internal list. In this manner, wireless terminal 124 is restricted to using base stations 102–103 and 112–113. The list of base stations in the first embodiment is transmitted to wireless terminal 124 by wireless switching system 101 when wireless terminal 124 registers on wireless switching system 101 and requests the list. In addition, if the list has changed since the wireless terminal last registered, wireless switching system 101 automatically transmits the list after registration. Wireless switching system 101 is responsive to the identification code of wireless terminal 124 to examine an internal table to determine the tenant to which wireless terminal 124 is assigned. Once the tenant is determined, wireless switching system 101 accesses the base stations which can be used by that tenant and downloads this information to wireless terminal 124. Alternatively, in the second embodiment, the owner of wireless switching system 101 provides a separate computer facility to which wireless terminal 124 is initially connected, and the list of base stations is downloaded to wireless terminal 124.

Consider the following examples of third and fourth embodiments of the invention. In the third and fourth embodiments, each tenant is assigned a tenant identification number. Each base station periodically transmits the tenant identification numbers for which the base station is providing service. The tenant identification numbers identify the tenants on whose base stations a wireless terminal can use. The tenant identification number may be stored in the wireless terminal by a separate computer facility or by downloading the tenant identification number to the wireless terminal when the wireless terminal first registers on wireless switching system 101. Before registering on a new base station, a wireless terminal interrogates the tenant identification number being transmitted by the base station to determine if a tenant identification number stored by the wireless terminal matches the transmitted number. If there is no match, the wireless terminal does not attempt to register on that base station.

Figure 2:
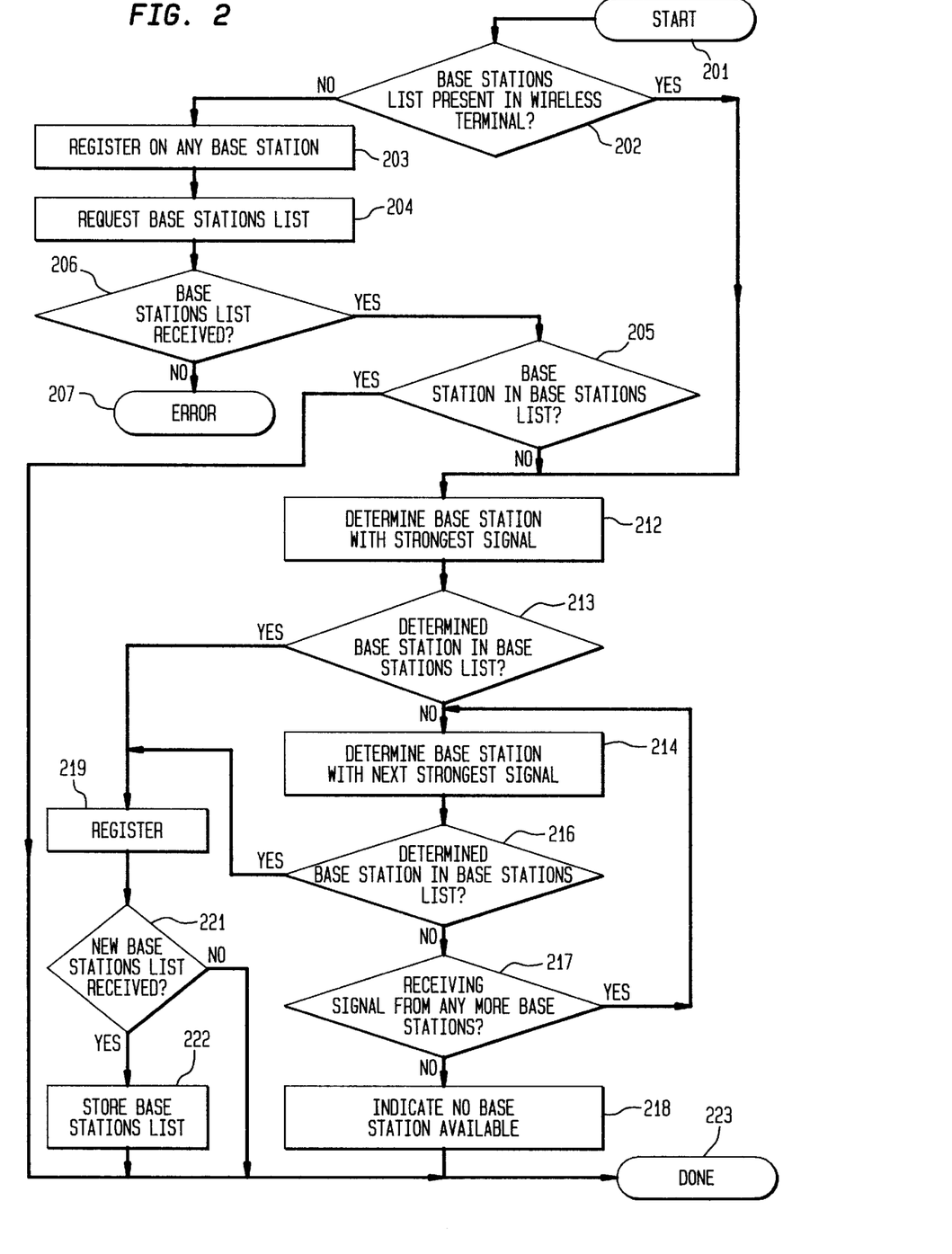
FIG. 2 illustrates, in flow chart form, a first embodiment of the invention.

FIG. 2 illustrates the first embodiment of the invention where the wireless terminal unit receives a list of base stations from wireless switching system 101. When wireless terminal 124 needs to register, it starts with block 201. Decision block 202 determines if the base stations list is present in wireless terminal 124. If the answer in decision block 202 is yes, then control is transferred to block 212. If wireless terminal 124 had not previously registered on wireless switching system 101 or had suffered a power failure, the base stations list would not be present within the wireless terminal. If the answer is no in decision block 202, block 203 is executed whereby wireless terminal 124 registers on any available base station.

After registering on a base station, block 204 requests the base stations list. Decision block 206 then determines if the base stations list is received. If the answer is no, error recovery is performed by block 207. If the answer is yes, decision block 206 stores the base stations list and transfers control to decision block 205. The latter decision block determines if the base station on which wireless terminal 124 is currently registered is in the base stations list. If the answer is yes, control is transferred to block 223 since registration has already been performed. If the answer is no in decision block 205, control is transferred to block 212 which determines the base station whose signal is currently being received at the highest level. Decision block 213 next determines if the base station determined in block 212 is in the base stations list. If the answer is yes, control is transferred to block 219 which registers wireless terminal 124 on wireless switching system 101. After registration is complete, decision block 221 determines if a new base stations list has been received from wireless switching system 101. If a change had been made to the base stations list for wireless terminal 124 since it had last registered on wireless switching system 101, wireless switching system 101 automatically transmits the new base stations list to wireless terminal 124. If the answer in decision block 221 is yes, block 222 stores the new base stations list internal to wireless terminal 124 and control is passed to done block 223. If the answer in decision block 221 is no, control is transferred to done block 223.

Returning to decision block 213, if the answer is no, block 214 determines the base station having the next strongest signal. Decision block 216 then determines if this next base station is in the base stations list. If the answer is yes, control is transferred to block 219. If the answer is no in decision block 216, decision block 217 determines if a signal is being received from any more base stations. If the answer is yes in decision block 217, control is transferred back to 214. However, if no more base stations are available for wireless terminal 124 to register on, block 218 indicates this fact to the user of wireless terminal 124 and the registration process terminates.

Figure 3:
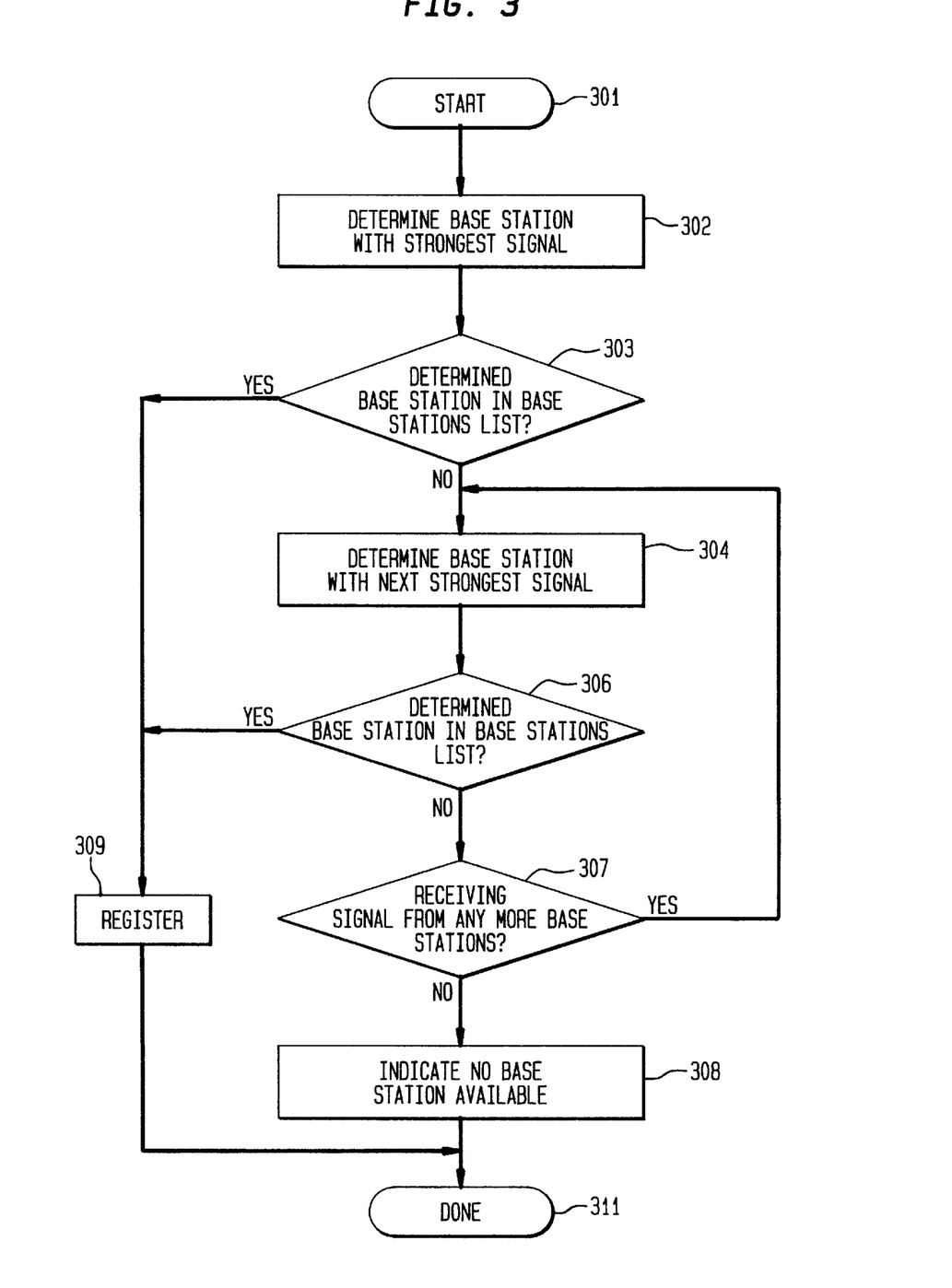
FIG. 3 illustrates, in flow chart form, a second embodiment of the invention.

FIG. 3 illustrates a second embodiment of the invention where a computer is utilized to load the base stations list into wireless terminal 124. Blocks 302–309 perform the same operations as blocks 212–219 of FIG. 2. However, the functions performed by blocks 203–205, 221, and 222 are not needed since no base stations list are received from wireless switching system 101.

Figure 4:
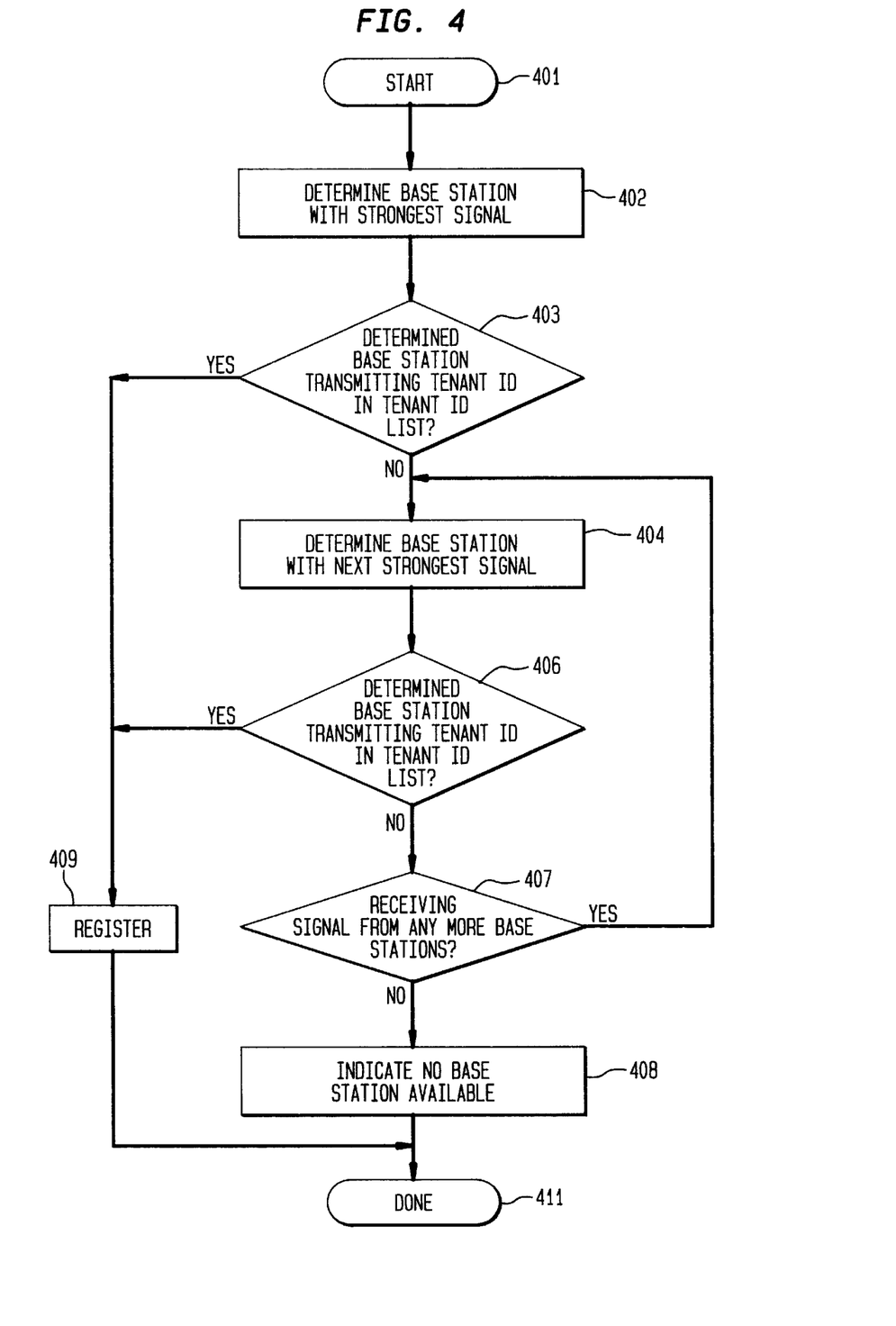
FIG. 4 illustrates, in flow chart form, a third embodiment of the invention.

FIG. 4 illustrates the third embodiment of the invention. In the third embodiment, wireless terminal 124 stores a list of tenant ID numbers received from a computer. Each tenant illustrated in FIG. 1 is assigned a tenant ID number. As previously described, certain tenants may wish to give all wireless terminals access to their base stations. Hence, wireless terminal 124 may have more than one tenant ID number in its stored tenant ID list. The tenant ID list is received offline from a computer. When it is time to register execution starts at block 401, block 402 determines the base station whose signal is the strongest. Decision block 403 then decides whether the determined base station is transmitting a tenant ID number that is in the tenant ID list for wireless terminal 124. If the answer is yes in decision block 403, block 409 registers wireless terminal 124 onto the determined base station.

If the answer in decision block 403 is no, block 404 determines the base station whose signal is the next strongest. Decision block 406 then decides if the next base station is transmitting a tenant ID that is in the tenant ID list of wireless terminal 124. If the answer in decision block 406 is yes, control is transferred to block 409. After execution of the latter block, control is transferred to done block 411. If the decision in decision block 406 is no, decision block 407 determines if a signal is being received from another base station. If the decision in decision block 407 is yes, control is transferred back to block 404. If the decision in decision block 407 is no, block 408 indicates to the user that there is no base station available for registration and transfers control to done block 411.

Figure 5:
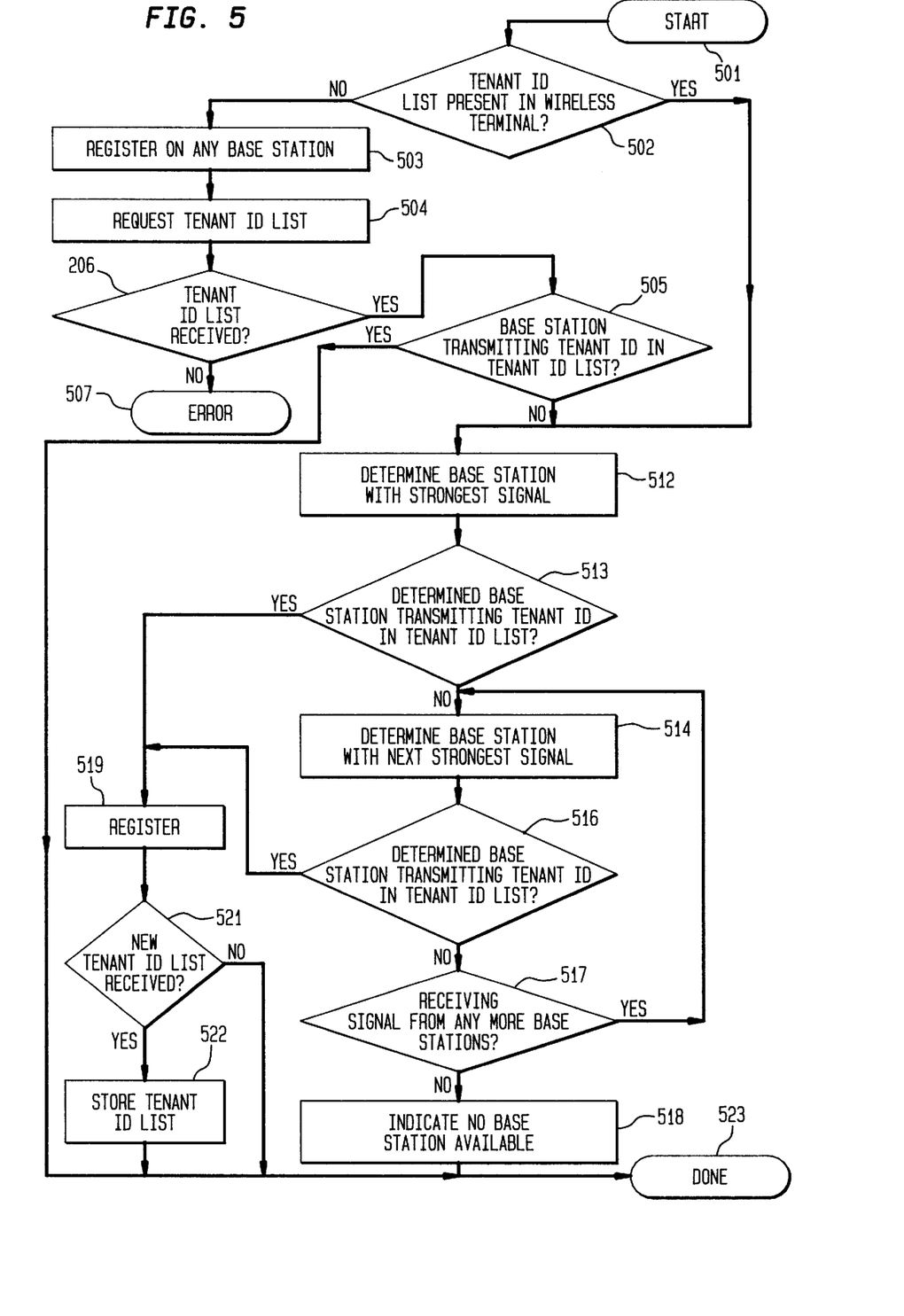
FIG. 5 illustrates, in flow chart form, a fourth embodiment of the invention.

FIG. 5 illustrates the fourth embodiment of the invention in which the tenant ID list is received from wireless switching system 101. When it is time for wireless terminal 124 to register, control is transferred from block 501 to decision block 502. Decision block 502 determines if the tenant ID list is present in the wireless terminal. If the answer is yes, control is transferred to block 512. If the answer is no in decision block 502, block 503 registers on any available base station. Block 504 then requests the tenant ID list from wireless switching system 101. Decision block 506 determines when the tenant ID list is received. If the list is not received, block 507 does error recovery. When the tenant ID list is received and stored by block 506, control is transferred to decision block 505. Decision block 505 determines if the base station on which wireless terminal 124 is presently registered is transmitting a tenant ID which is in the tenant ID list. If the answer is no, control is transferred to block 512. If the answer is yes, control is transferred to done block 523 which terminates registration since wireless terminal 124 is already registered. Blocks 512–519 perform the same operations as blocks 402–409 of FIG. 4 with the exception that block 519 transfers control to decision block 521. Decision block 521 determines if a new tenant ID list has been received from wireless switching system 101. The latter switching system transmits a new tenant ID list if the list has changed for wireless terminal 124 since its last registration. If a new tenant ID list is received, decision block 521 transfers control to block 522 which stores the tenant ID list. After execution of block 522, control is transferred to done block 523.

Figure 6:
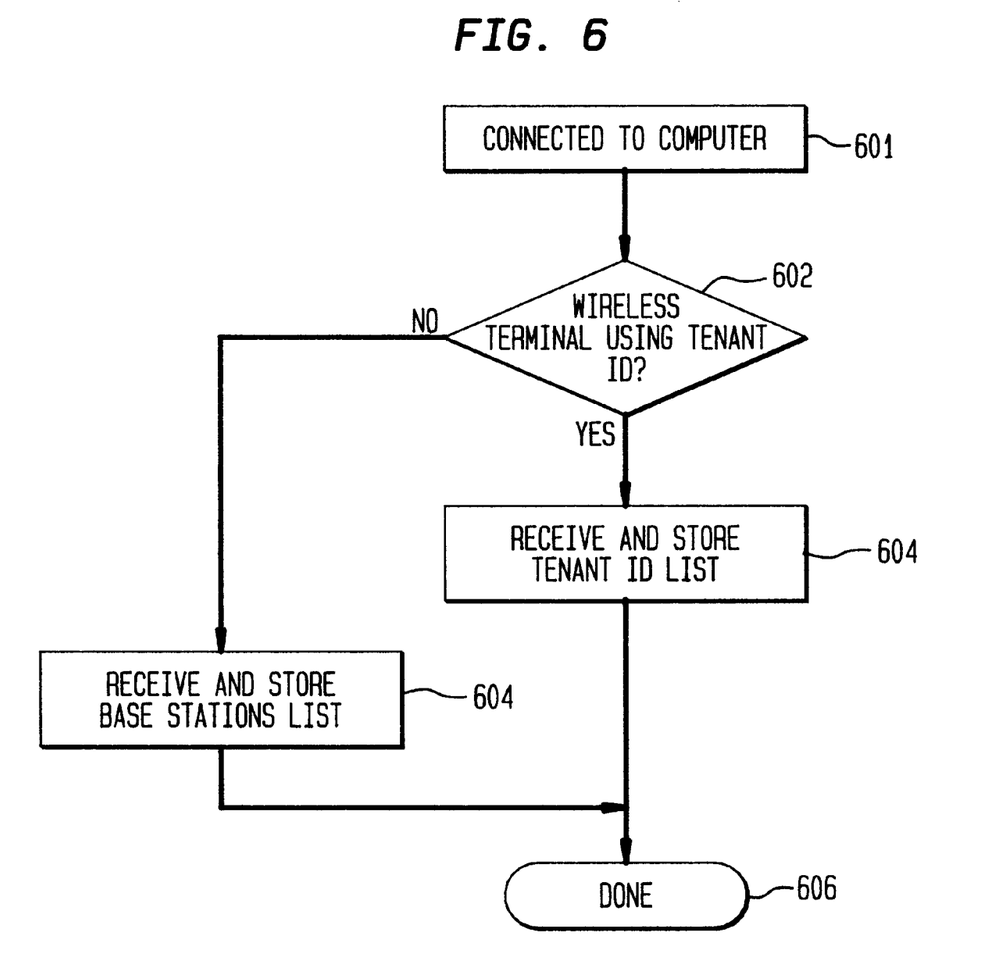
FIG. 6 illustrates, in flow chart form, the manner in which a wireless terminal receives a tenant or base station list from a computer.

FIG. 6 illustrates the flow chart for wireless terminal 124 receiving information from a computer. The information can either be a tenant ID list or a base stations list. Block 601 determines when wireless terminal 124 is connected to a computer. Decision block 602 then determines whether the wireless terminal is using tenant ID. If the answer is no, block 604 receives and stores the base stations list. However, if the decision in decision block 602 is yes, block 603 receives and stores the tenant ID list. In either case, execution terminates in done block 606.

Figure 7:
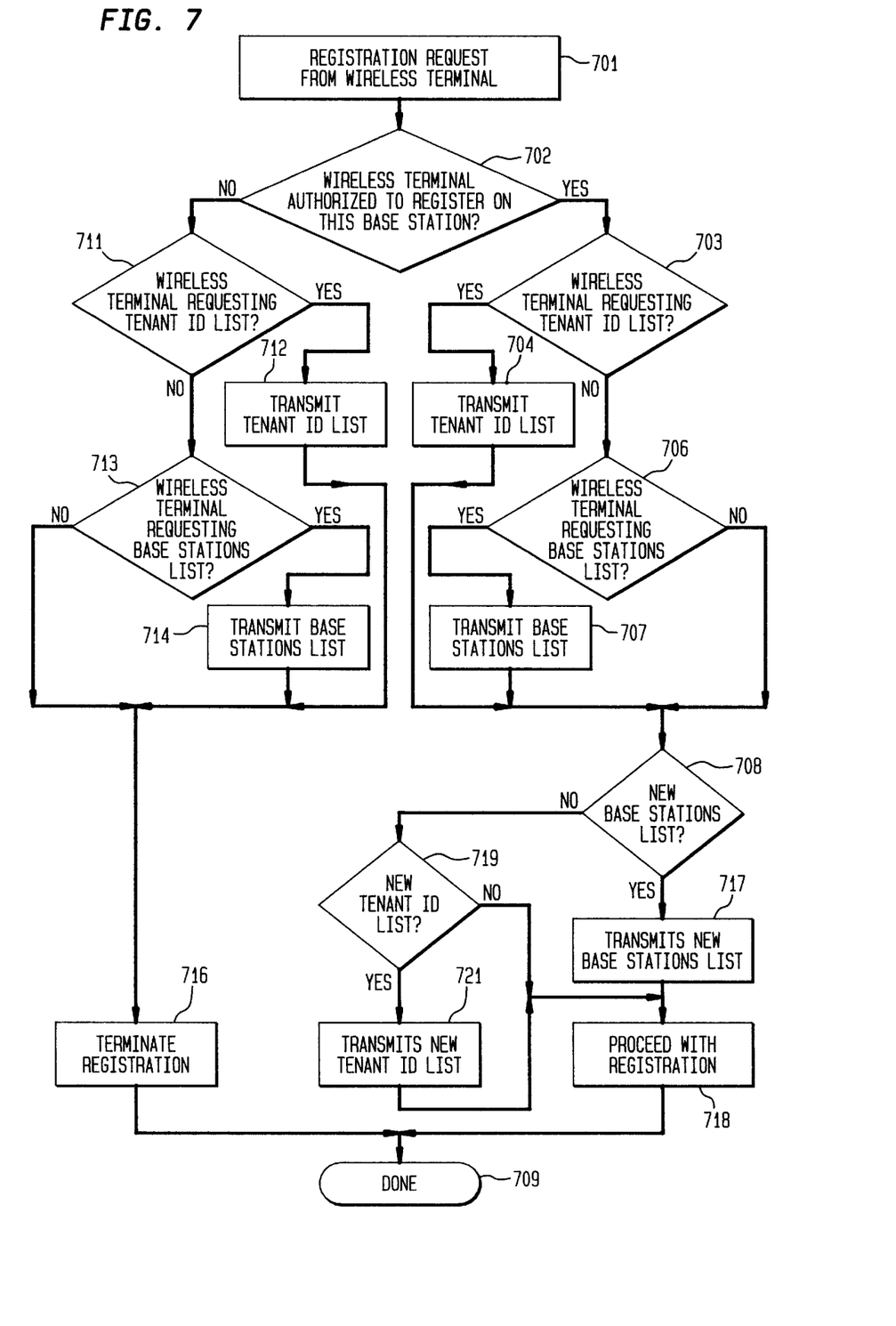
FIG. 7 illustrates, in flow chart form, operations performed by a wireless switching system in implementing the invention.

FIG. 7 illustrates the operations performed by wireless switching system 101 in implementing the first and fourth embodiments upon a wireless terminal registering on a base station. In response to a registration request from a wireless terminal, control is transferred from block 701 to decision block 702. The latter decision block determines if the wireless terminal is authorized to register on the base station presently being used. If the answer is no, control is transferred to decision block 711 which determines if the wireless terminal is requesting the tenant ID list. If the answer is yes, control is transferred to block 712 which transmits the tenant ID list for that wireless terminal to the wireless terminal. After transmission of the tenant ID list, control is transferred to block 716 which terminates the registration process and transfers control to block 709. Returning to decision block 711, if the answer is no, decision block 713 determines if the wireless terminal is requesting the base stations list. If the answer is no, control is transferred to block 716. If the answer in decision block 713 is yes, block 714 transmits the base stations list to the wireless terminal before transferring control to block 716.

Returning to decision block 702, if the wireless terminal is authorized to register on the base station, control is transferred to decision block 703 which determines if the wireless terminal is requesting its tenant ID list. If the answer is yes, control is transferred to block 704 which transmits the tenant ID list to the wireless terminal. After execution of block 704, control is transferred to decision block 708. The latter decision block determines if wireless switching system 101 has an updated version of the base stations list which has been updated since the last time that wireless terminal 124 registered. If the answer is yes, block 717 transmits the new base stations list to the wireless terminal and transfers control to block 718 which proceeds with the registration terminating in done block 709. If the answer is no in decision block 708, decision block 719 determines if there has been an update to the tenant ID list. If the answer is yes, block 721 transmits the updated tenant ID list to the wireless terminal before transferring control to block 718. If the answer in decision block 719 is no, control is transferred to block 718.

Returning to decision block 703, if the wireless terminal is not requesting the tenant ID list, control is transferred to decision block 706. The latter decision block determines if the wireless terminal is requesting its base stations list. If the answer is yes, control is transferred to block 707 which transmits the base stations list to the wireless terminal before transferring control to decision block 708. If the answer in decision block 706 is no, control is transferred to decision block 708.

Figure 8:
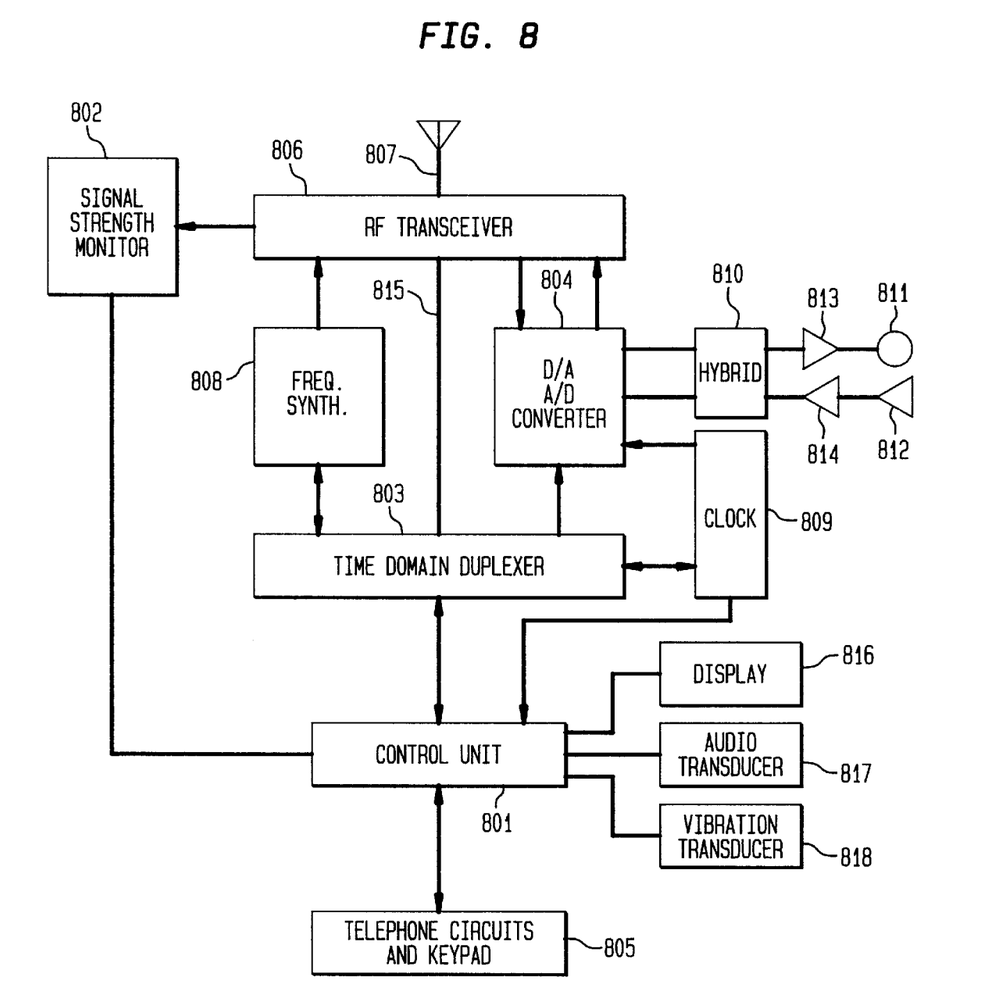
FIG. 8 illustrates, in block diagram form, a wireless terminal.

FIG. 8 illustrates, in block diagram form, the internal circuitry of wireless terminal 106. Control unit 801 provides overall control of wireless terminal 106. The radio functions are performed by elements 802, 803, 808, 809, and 806. The operation of these elements is described in greater detail in U.S. Pat. No. 5,396,541 which is hereby incorporated by reference. The telephone audio functions are performed by elements 201, 810, 813, 814, and 212. Display 202 and support circuitry are represented by display 816 on FIG. 8. Element 805 represents elements 203–211 of FIG. 2 with support circuitry. Control unit 801 utilizes signal strength monitor 802 to perform the functions that have been described with respect to determining the signal strength of a base station.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims.

The invention claimed is:

1. A method for providing wireless service to groups of wireless terminals on a wireless telecommunication system having a plurality of base stations, comprising the steps of:
    specifying to each group of wireless terminals an individual subset of the plurality of base stations; and
    restricting registration by each group of wireless terminals to its subset of the plurality of base stations.

2. The method of claim 1 wherein the step of specifying comprises the step of transmitting a list of the individual subset of the plurality of base stations to the each one of a group of wireless terminals upon registration on the wireless telecommunication system by each wireless terminal of the groups of wireless terminals.

3. The method of claim 1 wherein the step of specifying comprises the step of storing a list of the individual subset of the plurality of base stations in the each one of a group of wireless terminals by a separate computer facility.

4. The method of claim 1 further comprises the step of assigning a group number to each group of wireless terminals;
    storing the group number in one of the wireless terminals of the group assigned to that group number;

the step of specifying comprises the step of transmitting a group number designating a group of wireless terminals served by each one of the plurality of base stations; and the step of restricting comprises the step of determining if a group number stored in one of the wireless terminals is transmitted by one of the plurality of base stations before attempting to register on the one of the plurality of base stations by the one of the wireless terminals.

5. The method of claim 4 wherein the step of storing comprises the step of storing a list of group numbers designating a subset of the plurality of base stations on which the one of the wireless terminals can register; and the step of determining comprises further the step of determining if a group number in the list stored in one of the wireless terminals is transmitted by one of the plurality of base stations before attempting to register on the one of the plurality of base stations by the one of the wireless terminals.

6. The method of claim 5 wherein the step of storing comprises the step of transmitting the list of group numbers of each one of the group of wireless terminals upon each one of the group of wireless terminals requesting the list of group numbers.

7. The method of claim 5 wherein the step of storing comprises the step of transmitting the list of group numbers of each one of the group of wireless terminals upon registration on the wireless telecommunication system by each one of the group of wireless terminals and the list of group numbers having changed.

8. The method of claim 4 wherein the step of storing comprises the step of storing of the group number of a group of wireless terminals in the each one of the group of wireless terminals by a separate computer facility.

9. An apparatus for providing wireless service to groups of wireless terminals on a wireless telecommunication system having a plurality of base stations, comprising:

means for specifying to each group of wireless terminals an individual subset of the plurality of base stations; and means for restricting registration by each group of wireless terminals to its subset of the plurality of base stations.

10. The apparatus of claim 9 wherein the means for specifying comprises means for transmitting a list of the individual subset of the plurality of base stations to the each one of a group of wireless terminals upon registration on the wireless telecommunication system by each wireless terminal of the groups of wireless terminals.

11. The apparatus of claim 9 wherein the means for specifying comprises means for storing a list of the individual subset of the plurality of base stations in the each one of a group of wireless terminals by a separate computer facility.

12. The apparatus of claim 9 further comprises means for assigning a group number to each group of wireless terminals;

storing the group number in one of the wireless terminals of the group assigned to that group number;

the means for specifying comprises means for transmitting a group number designating a group of wireless terminals served by each one of the plurality of base stations; and the means for restricting comprises means for determining if a group number stored in one of the wireless terminals is transmitted by one of the plurality of base stations before attempting to register on the one of the plurality of base stations by the one of the wireless terminals.

13. The apparatus of claim 12 wherein the means for storing comprises means for storing a list of group numbers designating a subset of the plurality of base stations on which the one of the wireless terminals can register; and the means for determining comprises further determining if a group number in the list stored in one of the wireless terminals is transmitted by one of the plurality of base stations before attempting to register on the one of the plurality of base stations by the one of the wireless terminals.

14. The apparatus of claim 13 wherein the means for storing comprises means for transmitting the list of group numbers of each one of the group of wireless terminals upon each one of the group of wireless terminals requesting the list of group numbers.

15. The apparatus of claim 13 wherein the means for storing comprises means for transmitting the list of group numbers of each one of the group of wireless terminals upon registration on the wireless telecommunication system by each one of the group of wireless terminals and the list of group numbers having changed.

16. The apparatus of claim 12 wherein the means for storing comprises means for storing of the group number of a group of wireless terminals in the each one of the group of wireless terminals by a separate computer facility.

* * * * *